(12) United States Patent
Zwirn

(10) Patent No.: US 12,710,505 B2
(45) Date of Patent: Aug. 18, 2026

(54) SYSTEMS AND METHODS FOR FORWARD-SCATTER SENSING

(71) Applicant: Crosense Technologies LTD., Beit Yahoshua (IL)

(72) Inventor: Gil Zwirn, Petah Tikva (IL)

(73) Assignee: Crosense Technologies Ltd., RaAnana (IL)

( * ) Notice: Subject to any disclaimer, the term of this patent is extended or adjusted under 35 U.S.C. 154(b) by 250 days.

(21) Appl. No.: 18/705,973

(22) PCT Filed: Oct. 31, 2022

(86) PCT No.: PCT/IB2022/060481
§ 371 (c)(1),
(2) Date: Apr. 29, 2024

(87) PCT Pub. No.: WO2023/073663
PCT Pub. Date: May 4, 2023

(65) Prior Publication Data
US 2025/0012891 A1 Jan. 9, 2025

(30) Foreign Application Priority Data
Oct. 31, 2021 (IL) ........................................ 287739

(51) Int. Cl.
*G01S 5/02* (2010.01)
*G08G 5/26* (2025.01)

(52) U.S. Cl.
CPC .......... *G01S 5/0273* (2013.01); *G01S 5/0294* (2013.01); *G08G 5/26* (2025.01)

(58) Field of Classification Search
CPC ..... G08G 5/57; G01S 13/003; G01S 13/9058; G01S 7/414; G01S 5/0273; G01S 5/0294
(Continued)

(56) References Cited

U.S. PATENT DOCUMENTS 5,187,485 A * 2/1993 Tsui ........................ G01S 19/22 342/126
5,252,980 A * 10/1993 Gray .................... G01S 13/003 342/107
(Continued)

FOREIGN PATENT DOCUMENTS

WO WO 2019/073230 A1 4/2019

OTHER PUBLICATIONS

Radar Tutorial Scattering Mechanisms at www.radartutorial.eu (Year: 2024).*
(Continued)

*Primary Examiner* — Michael W Justice
(74) *Attorney, Agent, or Firm* — Meitar Patents Ltd.; Daniel Kligler

(57) ABSTRACT

Disclosed herein are systems and methods for passive sensing of unmanned aircrafts (UAs) using radio frequency (RF) signals transmitted by satellites and/or aerostats. One or more passive RF sensor units are employed, and each of the sensor units is configured to: produce one or more concurrent reception beams; receive RTSA resultant signals originating from one or more RTSAs, an RTSA being one of a satellite and an aerostat, which transmits RF signals, and an RTSA resultant signal is a signal transmitted by an RTSA after traversing a medium between the RTSA and the passive RF sensor unit; and process the received RTSA resultant signals to perform target detection based on the forward scatter effect. The systems and methods may also provide additional UA situational surveillance capabilities, e.g., target detection, target tracking, target classification, target identification, and prediction and/or detection of events associated with UA safety and/or security.

26 Claims, 4 Drawing Sheets

(58) Field of Classification Search
USPC .................................................. 342/450, 453
See application file for complete search history.

(56) References Cited

U.S. PATENT DOCUMENTS 5,926,133 A * 7/1999 Green, Jr. ............ H04W 64/00 342/450
6,232,922 B1 * 5/2001 McIntosh ................ G01S 19/14 342/453
6,744,408 B1 * 6/2004 Stockmaster ........... G01S 19/22 342/13
8,373,591 B2 * 2/2013 Margolin .................. G01S 5/12 342/146
8,643,534 B2 * 2/2014 Margolin .............. G01S 13/003 342/146
9,780,859 B2 * 10/2017 Chang .................. H04B 7/0626
9,905,134 B2 * 2/2018 Kube ....................... G08G 5/59
10,069,553 B2 * 9/2018 Chang .................. H04B 7/0626
10,277,306 B2 * 4/2019 Chang ................ H04B 7/18506
10,371,794 B2 * 8/2019 Kim ........................ B64C 9/326
10,429,490 B2 * 10/2019 Kim ........................ B64C 9/326
10,574,338 B1 * 2/2020 Chang ................ H04B 7/18504
10,911,121 B2 * 2/2021 Chang ................... H04L 5/0048
11,150,334 B2 * 10/2021 Pieraccini ........... G01S 13/9058
12,333,923 B2 * 6/2025 Henry ....................... B64F 1/18
2011/0169684 A1 * 7/2011 Margolin .............. G01S 13/003 342/30
2013/0176163 A1 * 7/2013 Margolin .............. G01S 13/003 342/118
2014/0219124 A1 * 8/2014 Chang .................. H04B 7/0413 370/252
2016/0240087 A1 * 8/2016 Kube ................... G05D 1/0011
2017/0164227 A1 * 6/2017 Zwirn ................... H04W 24/10
2017/0297712 A1 * 10/2017 Kim ....................... B64U 10/25
2018/0048371 A1 * 2/2018 Chang ................... H04L 5/0048
2018/0102832 A1 * 4/2018 Chang ................ H04B 7/18504
2018/0329026 A1 * 11/2018 Kim ........................ B64C 9/326
2019/0020397 A1 * 1/2019 Chang .................. H04B 7/0413
2020/0142047 A1 * 5/2020 Zwirn ................... G01S 13/003
2020/0379097 A1 * 12/2020 Pieraccini ........... G01S 13/9023
2021/0284335 A1 * 9/2021 Mclaughlin ............. B64F 1/362
2023/0204774 A1 * 6/2023 Salter ..................... B64U 20/83 356/4.01

OTHER PUBLICATIONS

Written Opinion issued by the European Patent Office (EPO), European Patent Application No. 22886295.9, dated Oct. 15, 2025.
Extended European Search Report (EESR), Application No. EP 22886295.9, dated Oct. 15, 2025.
International Search Report and Written Opinion for International Application No. PCT/IB2022/060481, mailed on Feb. 15, 2023.

* cited by examiner

SYSTEMS AND METHODS FOR FORWARD-SCATTER SENSING

FIELD OF THE INVENTION

The present invention relates generally to passive sensing (i.e., sensing using signal reception only) of unmanned aircrafts (UAs) based on the forward scatter effect, using radio frequency (RF) signals transmitted by satellites and/or aerostats.

BACKGROUND OF THE INVENTION

UAs and their Applications

An aircraft is a vehicle or machine that is able to fly by gaining support from the air. Common examples of aircrafts include airplanes, helicopters, airships and blimps, gliders, paramotors, and hot air balloons.

The term "unmanned aircraft" (UA), sometimes referred to as "unmanned aerial vehicle" (UAV) or "drone," relates to an aircraft without any human pilot on board. A UA may operate under remote control by a human operator, or with various degrees of autonomy, e.g., a fully autonomous aircraft that has no provision for human intervention. In some cases, a UA may be a component of an unmanned aircraft system (UAS), which also includes a ground-based controller and a system of communication with the UA.

UAs (especially small UAs) are becoming increasingly prevalent. They are used for a wide variety of applications, such as:

(a) Still and video photography;
(b) Area mapping and surveying;
(c) Inspection for faults and malfunctions;
(d) Localization and tracking of activities, persons, and livestock;
(e) Aerial distribution of solids or liquids;
(f) Delivery of packages, food, pharmaceuticals, and other goods; and
(g) Intralogistics and warehousing.

Sensors Used for UA Situational Surveillance

The term "UA situational surveillance" relates to the gathering of information regarding UAs within a volume of interest using one or more sensors. UA situational surveillance may include one or more of the following: target detection (including UA detection), target tracking, target classification, target identification, and prediction and/or detection of events associated with UA safety and/or security (for instance, UAs that do not adhere to safety regulations, e.g., requirements relating to minimal separation between aircrafts, or UAs entering unauthorized airspace).

Some UA situational surveillance systems employ radars. For example, international patent application PCT/EP2017/063367, by Harman, published on Dec. 7, 2017, titled "Drone detection radar," discloses a drone detection radar comprising a plurality of antenna systems, each antenna system being arranged to transmit a signal into an associated sector, and to receive signals reflected from targets in the sector, the sectors collectively forming a monitored volume, and wherein a sub-set of the antenna systems are active at any one time, with the active sub-set of antenna systems being arranged to monitor their respective volumes for a duration sufficient to measure Doppler signals associated with slow moving drones, with the radar being arranged to switch to a different sub-set of antenna systems after each duration, such that the whole volume is monitored within a predetermined period. Combining a staring array from an antenna system with a plurality of switched antenna systems allows drones to be both detected and tracked, with appropriate selection of the predetermined period.

Certain UA situational surveillance systems are based on radio frequency (RF) sensors monitoring the spectrum used by UAs. For instance, U.S. patent application Ser. No. 16/407,106, by Graham, Piscopo, and O'Shea, published on Nov. 14, 2019, titled "System and method for mobile and distributed cloud-centric detection of unmanned systems," discloses a UAS detection device including a sensor having programmed instructions to cause the sensor to scan energy in an electromagnetic spectrum; process the energy in the electromagnetic spectrum into bursts; determine whether the bursts are valid UAS bursts based on burst criteria; and correlate the bursts into a single signal.

Further UA situational surveillance systems employ acoustic sensors. For example, U.S. patent application Ser. No. 16/295,091, by Woods et al., published on Sep. 10, 2020, titled "Systems and methods for threat response," discloses threat response systems and methods providing a mean to secure an area efficiently, safely, and around the clock. The system includes a plurality of microphones strategically located at various locations of the protected area, a plurality of acoustic beacons to provide navigational support one or more autonomous non-flying (ANF) drones, and a central controller. Each of the one or more ANF drones can be equipped with an acoustic positioning system that uses beacon signals transmitted by the plurality of acoustic beacons to determine its position relatively to the plurality of acoustic beacons. Once an acoustic event is detected, it can be analyzed to determine whether there is a threat. If the threat is confirmed, the central controller can dispatch one or more of the ANF drones to investigate and/or to engage the target.

Even further UA situational surveillance systems are based on video cameras, electro-optical (EO) sensors, and/or infrared (IR) sensors. For instance, U.S. Pat. No. 10,733,442, by Stryjewski and Rodgers, issued on Aug. 4, 2020, titled "Optical surveillance system," discloses an optical surveillance system for detecting and tracking targets of interest, configured to capture optical data of a first region of the atmosphere at a first refresh rate and to capture optical data of a second region of the atmosphere at a second refresh rate that is different than the first refresh rate.

Certain UA situational surveillance systems comprise sensors of more than one type. For example, U.S. Pat. No. 10,498,955, by Nadler, issued on Dec. 3, 2019, titled "Commercial drone detection," discloses a method of capturing the presence of a drone, including: collecting, using at least one sensor, data associated with an aerial object; analyzing, using a processor, the data to determine at least one characteristic of the aerial object; accessing, in a database, a library of stored characteristics of commercially available drones; determining, based on the analyzing, if the at least one characteristic of the aerial object matches a characteristic of a commercially available drone; and responsive to the determining, generating an indication of a positive match. The at least one sensor can include at least one of the following: video cameras, microphones or acoustic sensors, and radiofrequency antennas.

The Forward Scatter Effect

The forward scatter effect is described, for example, by Gashinova et al., in a paper entitled "Signal characterisation and processing in the forward scatter mode of bistatic passive coherent location systems," EURASIP Journal on Advances in Signal Processing, vol. 2013:36, 2013.

Forward scatter geometry is shown in FIG. 1. Forward scatter occurs when an object (13) approaches the baseline (20) (i.e., the connecting line between the transmitting antenna (11) and the receiving antenna (12)), that is, when the bi-static angle β (defined as the angle subtended between a transmitting antenna (11), an object (13), and a receiving antenna (12)) approaches 180°. Some of the main characteristics of forward scatter from an object:

(a) In the optical region (where the typical object dimension D is much larger than the wavelength λ of the illuminating signal), the object's radar cross-section (RCS) magnitude is typically much higher for forward scatter than for other configurations, reaching a maximum value $\sigma_{FS}$ at bi-static angle β=180°, given by:

$$\sigma_{FS} = \frac{4\pi A^2}{\lambda^2} \quad (1)$$

where A is the object's physical silhouette area. The value of $\sigma_{FS}$ is independent of the object materials. The sharp increase in the magnitude of the object's RCS at forward scatter is called the "forward scatter effect;"

(b) When examining the object's RCS magnitude as a function of the bi-static angle β, the angular width $\theta_{FS}$ of the "forward scatter region" (being the angular region where forward scatter occurs, centered at bi-static angle β=180°) is given by:

$$\theta_{FS} \approx K\frac{\lambda}{D} \quad (2)$$

where K depends on the reference level used to define the angular width (with respect to the maximal value $\sigma_{FS}$) as well as on the object's shape. For rectangular and spherical objects and a reference level of 3 dB below the maximal value $\sigma_{FS}$, K≈1, but for more complex objects K is between 1 and 4; and (c) Within the forward scatter region, the object's RCS magnitude changes slowly with the object's spatial angle with respect to the transmitting antenna (11) and the receiving antenna (12). As a result, the maximal coherent analysis time is typically equal to the object visibility time.

Note that as the bi-static angle β approaches 180°, the range resolution of common bi-static radars is reduced by a factor of cos (β/2), and the ability to measure range is completely lost at β=180°.

Passive Forward Scatter Radars

The forward scatter effect is used in some radar systems known in the art. For example, U.S. patent application Ser. No. 13/552,167, by Suberviola and Anorga, published on Jan. 9, 2014, titled "Calculator, system, method and computer program for obtaining one or more motion parameters of a target," discloses a calculator for obtaining motion parameters of a radar target (including, for instance, target trajectory and/or velocity parameters), wherein the calculator is configured to obtain the one or more motion parameters on the basis of at least two time differences. The first time difference describes a timing of passing of a first pair of transmitter-receiver-lines by the target, and the second time difference describes a timing of passing of a second pair of transmitter-receiver-lines by the target, wherein the second pair of the transmitter-receiver-lines is different from the first pair of transmitter-receiver-lines. A "transmitter-receiver-line" is referred to herein as a baseline (20), i.e., a connecting line between the transmitting antenna (11) and the receiving antenna (12).

Transmissions by Satellites and/or Aerostats

RF signals may be transmitted by satellites or by systems carried by satellites (such as communication devices and radars) for a wide range of uses. For example, according to a report entitled "Spectrum and the technological transformation of the satellite industry," published by the Satellite Industry Association in 2020, there are several categories to the service segment of the commercial satellite industry:

(a) Communications, which includes television services, radio services, and broadband internet services (e.g., in-flight and maritime services);

(b) Remote sensing, i.e., detecting and monitoring the physical characteristics of an area by measuring the reflected or emitted radiation from said area; and (c) Global navigation satellite systems (GNSS), e.g., the global positioning system (GPS).

RF frequency bands which are commonly used by the commercial satellite industry include:

(a) VHF/UHF bands (30-300 MHz and 300-3000 MHz respectively);

(b) L-band (1-2 GHz) and S-band (2-4 GHz);

(c) C-band (3.4-6.725 GHZ);

(d) X-band (7-11.2 GHz);

(e) Ku-band (10.95-14.5 GHZ);

(f) Ka-band (17.3-30 GHz); and (g) Q-band (33-50 GHz) and V-band (50-75 GHz).

In recent years, aerostats have increased in reliability, safety, size, and carrying capacity. Aerostats can carry various payloads, such as radars, communication repeaters, high-resolution video cameras, and electro-optical/infrared sensors. Many of these payloads may transmit RF signals.

SUMMARY OF THE INVENTION

Embodiments of the present invention provide systems and methods for passive sensing (i.e., sensing using signal reception only) of unmanned aircrafts (UAs) based on the forward scatter effect, using radio frequency (RF) signals transmitted by satellites and/or aerostats.

According to a first aspect of the invention, there is provided a system for passive sensing of UAs within a target volume using RF signals transmitted by satellites and/or aerostats, said system comprising one or more passive RF sensor units, wherein each of said one or more passive RF sensor units is configured to:

produce one or more concurrent reception beams;

receive RTSA resultant signals originating from one or more RTSAs, wherein an RTSA is one of a satellite and an aerostat, which transmits RF signals, and wherein an RTSA resultant signal is a signal transmitted by said RTSA after traversing a medium between said RTSA and said passive RF sensor unit; and process said received RTSA resultant signals to perform target detection based on the forward scatter effect.

According to a second aspect of the invention, there is provided a method for passive sensing of UAs within a target volume using RF signals transmitted by satellites and/or aerostats, said method comprising:

receiving RTSA resultant signals originating from one or more RTSAs using one or more passive RF sensor units, wherein each of said one or more passive RF sensor units employs one or more concurrent reception beams, wherein an RTSA is one of a satellite and an aerostat, which transmits RF signals, and wherein an RTSA resultant signal is a signal transmitted by said RTSA after traversing a medium between said RTSA and said passive RF sensor unit; and processing said received RTSA resultant signals, wherein said processing said received RTSA resultant signals comprises performing target detection based on the forward scatter effect using one or more of the following:

defining one or more RTSA resultant signal attributes, computing values of said one or more RTSA resultant signal attributes for one or more time-swaths during a reception beam, and detecting deviations from expected values of said one or more RTSA resultant signal attributes that meet certain predefined criteria;

estimating a transmission resultant signal, and detecting differences between said received RTSA resultant signal and said estimated transmission resultant signal that meet certain predefined criteria, wherein said transmission resultant signal is said RTSA resultant signal after subtracting the contribution of signals resulting from reflection and/or scattering from targets;

applying auto-correlation to said received RTSA resultant signal, and detecting deviations between the auto-correlation output and the auto-correlation output expected in the absence of targets, that meet certain predefined criteria;

estimating said transmission resultant signal, applying cross-correlation between said received RTSA resultant signal and said estimated transmission resultant signal, and detecting peaks in the cross-correlation output other than the peak corresponding to a zero time-delay that meet certain predefined criteria; and estimating said transmission resultant signal, computing a difference between said received RTSA resultant signal and said estimated transmission resultant signal to obtain a resultant signal difference, computing a cross-correlation between said resultant signal difference and said estimated transmission resultant signal, and detecting peaks in the cross-correlation output that meet certain predefined criteria.

Other aspects of the present invention are detailed in the claims.

BRIEF DESCRIPTION OF THE DRAWINGS

The invention for passive sensing of UAs based on the forward scatter effect, using RF signals transmitted by satellites and/or aerostats is herein described, by way of example only, with reference to the accompanying drawings.

With specific reference now to the drawings in detail, it is emphasized that the particulars shown are by way of example and for purposes of illustrative discussion of the embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF EMBODIMENTS

System Overview

Figure 1:
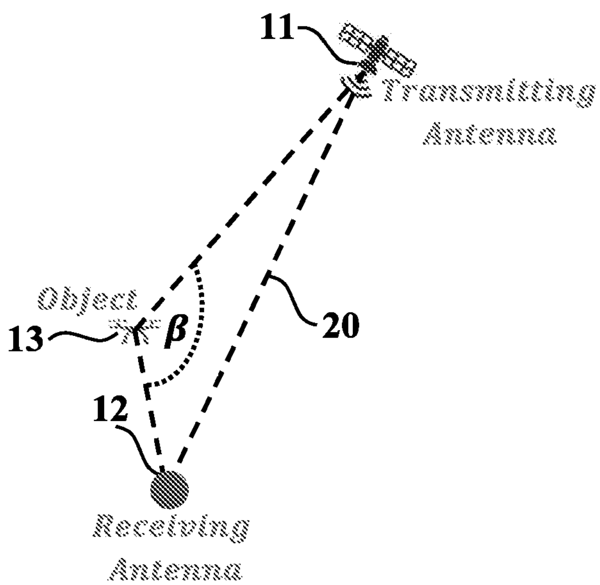
FIG. 1 is a schematic, pictorial illustration of forward scatter geometry, in accordance with an embodiment of the present invention.

In broad terms, the present invention relates to systems and methods for passive sensing (i.e., sensing using signal reception only) of UAs based on the forward scatter effect, using RF signals transmitted by satellites and/or aerostats. The passive sensing is performed within a volume of interest referred to as a "target volume." Objects detected by the passive sensing are referred to as "targets." A target may of various types, e.g., a UA, a manned aircraft, a bird, or an insect. Targets which are UAs are referred to as "relevant targets." The term "RTSA" (RF-transmitting satellite or aerostat) is defined as one of: a satellite and an aerostat, which transmits RF signals.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In embodiments of the present invention, one or more receiving-only RF sensors ("passive RF sensor units") (50) receive signals transmitted by one or more RTSAs after traversing a medium, which may include, e.g., the atmosphere and/or free space, and undergoing various physical phenomena along their path such as attenuation, reflection, scattering, refraction, diffraction, dispersion, polarization-shift, multi-path, and so forth, wherein the various physical phenomena result from interactions with the medium and possibly with targets and/or terrain within (or near) the target volume (a signal transmitted by an RTSA after traversing a medium between the RTSA and the passive RF sensor unit is referred to as an "RTSA resultant signal"). The signals transmitted by the one or more RTSAs may be transmitted for any application, e.g., communications, remote sensing, or GNSS, using any waveform known in the art. Each of the one or more passive RF sensor units (50) processes the received RTSA resultant signals to perform target detection based on the forward scatter effect, and optionally further performs one or more of the following processes (as described herein below), relating to UA situational surveillance:

(a) Target location and/or velocity estimation;
(b) Target tracking;
(c) Target classification into one of several predefined categories, e.g., UA, manned aircraft, bird, and insect;
(d) Identification of a target's specific type, possibly including the target's make and/or model;
(e) Prediction and/or detection of events associated with UA safety and/or security. Examples for such events: a UA that does not adhere to safety regulations, e.g., requirements relating to minimal separation between aircrafts, or a UA entering unauthorized airspace;
(f) Gathering information required for target location and/or velocity estimation;
(g) Gathering information required for target classification into one of several predefined categories; and
(h) Gathering information required for identification of a target's specific type, possibly including the target's make and/or model.

In some embodiments, the system further comprises one or more multi-sensor analysis units (70), wherein each of the one or more multi-sensor analysis units (70) receives data from two or more passive RF sensor units (50) and processes it to provide one or more of the following (as described herein below), relating to UA situational surveillance:

(a) Target location and/or velocity estimation;
(b) Target tracking;
(c) Target classification into one of several predefined categories, e.g., UA, manned aircraft, bird, and insect;
(d) Identification of a target's specific type, possibly including the target's make and/or model; and
(e) Prediction and/or detection of events associated with UA safety and/or security. Examples for such events: a UA that does not adhere to safety regulations, e.g., requirements relating to minimal separation between aircrafts, or a UA entering unauthorized airspace.

In further embodiments, a multi-sensor analysis unit (70) may also control one or more passive RF sensor units (50) to which it is connected.

In even further embodiments, each of the multi-sensor analysis units (70) is associated with a different group of passive RF sensor units (50) (for example, each such group of passive RF sensor units (50) may cover a different volume within the target volume), and data is transferred via a communication network (which may be wired and/or wireless) between two or more of the multi-sensor analysis units (70). This data may be used to associate outputs of target detection and/or outputs of target tracking which correspond to the same physical target and are produced by multiple multi-sensor analysis units (70) (to produce "association outputs"), and optionally perform one or more of the following:

(a) Extended target tracking, over longer time periods and larger volumes (relevant when the volume covered by all multi-sensor analysis units (70) connected to the communication network is larger than the volume covered by a single multi-sensor analysis unit (70));
(b) Enhanced tracking accuracy, based on compounding association outputs from multiple multi-sensor analysis units (70) (relevant when there is some overlap between the volumes covered by the multi-sensor analysis units (70) connected to the communication network); and
(c) Enhanced classification and/or identification performance, making use of the data provided by multiple multi-sensor analysis units (70).

In some embodiments, the system further comprises a central analysis unit (75), which receives and processes data from one or more multi-sensor analysis units (70), and optionally data from one or more passive RF sensor units (50), to provide UA situational surveillance for the entire target volume. This may include associating outputs of target detection and/or outputs of target tracking which correspond to the same physical target and are produced by multiple multi-sensor analysis units (70), multiple passive RF sensor units (50), and/or one or more multi-sensor analysis units (70) and one or more passive RF sensor units (50) (yielding "central association outputs"), and optionally performing one or more of the following:

(a) Extended target tracking, over longer time periods and larger areas;
(b) Enhanced tracking accuracy, based on compounding central association outputs from one or more multi-sensor analysis units (70) and/or one or more passive RF sensor units (50); and
(c) Enhanced classification and/or identification performance, making use of the data provided by one or more multi-sensor analysis units (70) and/or one or more passive RF sensor units (50).

In further embodiments, a central analysis unit (75) may also control one or more multi-sensor analysis units (70) and/or one or more passive RF sensor units (50) to which it is connected.

In certain embodiments, the system further includes one or more user interface units (90), capable of controlling the system and/or displaying its outputs. The user interface units may employ any computing platform, such as a cloud server, a local server, a desktop, a laptop, a tablet computer, a smart phone, and the like.

Figure 2:
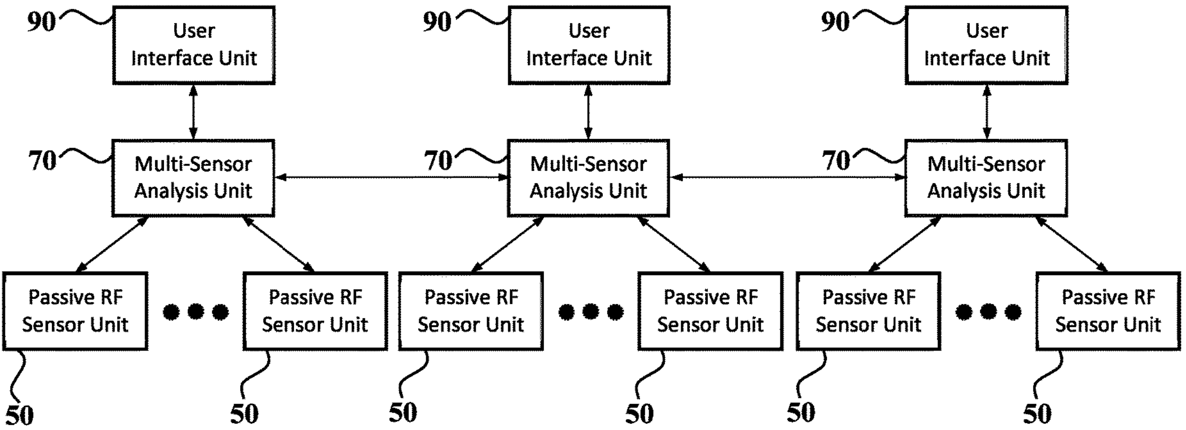
FIG. 2 is a schematic, pictorial illustration of a system for passive sensing of UAs based on the forward scatter effect, in accordance with an embodiment of the present invention. Data lines, which may be wired and/or wireless, are marked by solid arrows.

An example for a system configuration, wherein there is no central analysis unit (75), and data is transferred between all multi-sensor analysis units (70), can be seen in FIG. 2. In this example, each multi-sensor analysis unit (70) is connected to a separate user interface unit (90).

Figure 3:
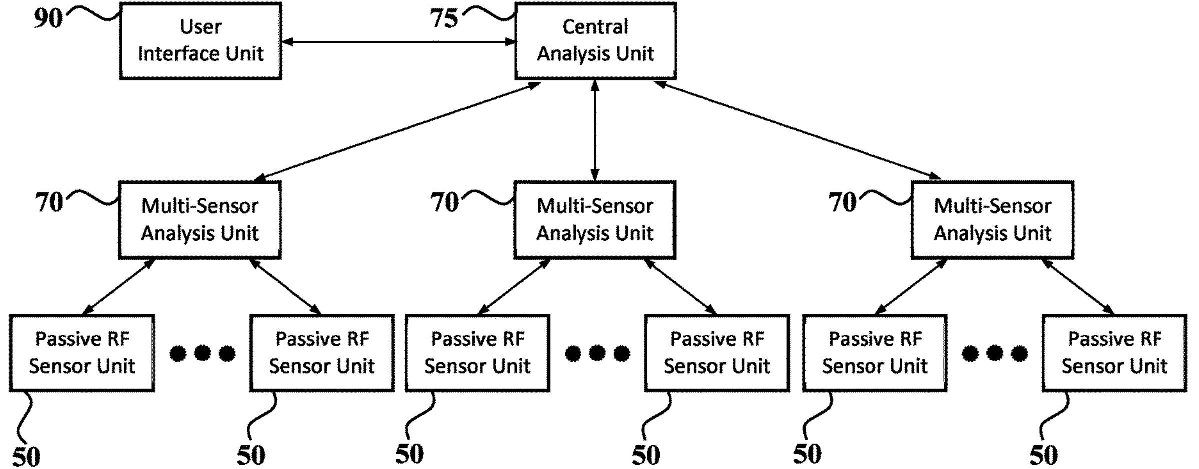
FIG. 3 is a schematic, pictorial illustration of a system for passive sensing of UAs based on the forward scatter effect, in accordance with an embodiment of the present invention. Data lines, which may be wired and/or wireless, are marked by solid arrows.
Figure 4:
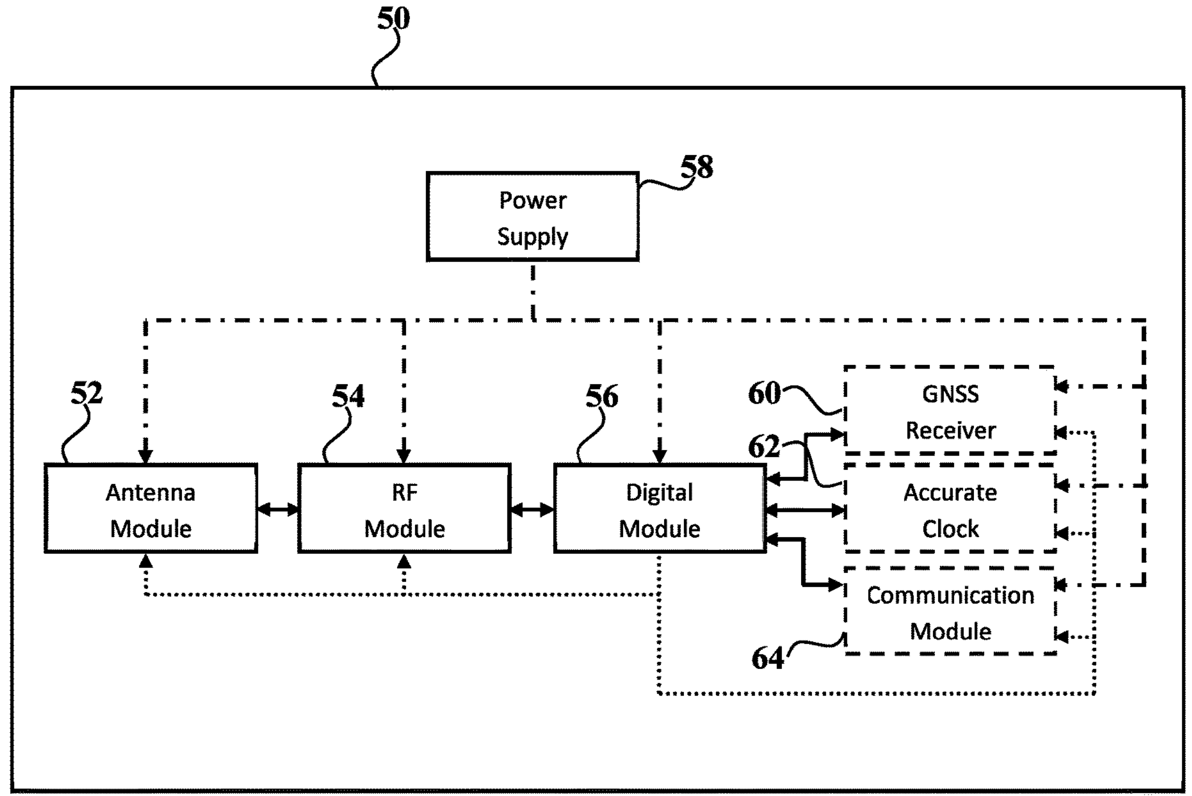
FIG. 4 is a schematic block diagram of a passive RF sensor unit (50), in accordance with an embodiment of the present invention. Blocks with dashed outlines (60, 62, and 64) are optional. Solid arrows, dotted arrows, and dash-dotted arrows, represent data lines, control lines (optional), and power lines respectively.

Another example for a system configuration, wherein all multi-sensor analysis units (70) are connected to a central analysis unit (75), can be seen in FIG. 3. In this example, there is one user interface unit (90) connected to the central analysis unit (75).

Passive RF Sensor Units

The RF transmissions of each RTSA may employ pulsed wave (PW) and/or continuous wave (CW).

Each RTSA whose RF transmissions are used by one or more RF sensor units (50) may be stationary or mobile with respect to the corresponding RF sensor units (50). For instance, low earth orbit (LEO) satellites have a typical velocity of approximately 7.8 km/sec with respect to the earth's surface at the nadir.

In some embodiments, each of the passive RF sensor units (50) may be either stationary or mobile.

In further embodiments, each of the passive RF sensor units (50) may be ground-based, shipborne, or airborne.

In some embodiments, each passive RF sensor unit (50) comprises the following:

(a) An antenna module (52), used for receiving RTSA resultant signals. The antenna module may include one or more antennas of any type, e.g., a horn antenna, a reflector antenna, or an array antenna. Each antenna may support one or more polarizations (e.g., horizontal polarization, vertical polarization, right circular polarization, and/or left circular polarization);

(b) An RF module (54), applying at least analog-to-digital (A/D) conversion to the signal received by the antenna module (52). For instance, for array antennas, the RF module may apply sampling to the beamformed signal produced by the entire antenna, to the beamformed signal produced by one or more sub-arrays of the antenna, and/or to the signal received by each antenna element separately;

(c) A digital module (56), processing samples generated by the RF module (54). The digital module (56) may further determine parameters for the RF module (54) and/or the antenna module (52). The digital module (56) may include one or more of the following: a central processing unit (CPU), a graphic processing unit (GPU), a digital signal processor (DSP), a field-programmable gate array (FPGA), or an application specific integrated circuit (ASIC); and (d) A power supply (58), which may include a battery.

In further embodiments, the RF module (54) and/or the digital module (56) may also address one or more of the following: phase-shifting, true-time-delay application, gain control, down-conversion, band-pass filtering, low-pass filtering, matched filtering, and beamforming.

In certain embodiments, the digital module (56) may further perform one or more of the following (as described herein below):

(a) Management of the reception beams produced by the passive RF sensor unit (50);

(b) Calibration processes;

(c) Built-in tests;

(d) Processes relating to UA situational surveillance, including:

(i) Target detection;

(ii) Target location and/or velocity estimation;

(iii) Target tracking;

(iv) Target classification into one of several predefined categories, e.g., UA, manned aircraft, bird, and insect;

(v) Identification of a target's specific type, possibly including the target's make and/or model;

(vi) Prediction and/or detection of events associated with UA safety and/or security;

(vii) Gathering information required for target location and/or velocity estimation;

(viii) Gathering information required for target classification into one of several predefined categories; and (ix) Gathering information required for identification of a target's specific type, possibly including the target's make and/or model.

In some embodiments, at least one of the passive RF sensor units (50) further includes one or more of the following:

(a) A GNSS receiver (60), e.g., a GPS receiver, providing accurate time and/or location information to the digital module (56);

(b) An accurate clock (62), e.g., a rubidium atomic clock; and (c) A communication module (64), which may be wired and/or wireless, and can be used for data transfer between the digital module (56) and one or more of the multi-sensor analysis units (70), and/or between the digital module (56) and the central analysis unit (75), for example, via an intranet or the internet.

In certain embodiments, a passive RF sensor unit (50) may produce one or more concurrent reception beams at any given time. Each reception beam may be characterized by one or more of the following parameters ("beam characteristics"):

(a) A spatial angle corresponding to the center of the beam's mainlobe ("beam direction");

(b) A beam pattern (partially characterized by a beam width);

(c) A reception phase center, i.e., the apparent location where RF signals are received;

(d) A polarization configuration (e.g., horizontal polarization, vertical polarization, right circular polarization, or left circular polarization);

(e) A reception central frequency;

(f) A reception bandwidth;

(g) A start-time; and (h) A time duration ("integration-time").

In further embodiments, beam steering may be performed mechanically and/or electronically, wherein beam steering determines the beam direction for reception beams. Note that for a mobile RTSA, the beam direction may be adjusted over time to match the RTSA's trajectory.

In even further embodiments, one or more of the following configurations may be employed for at least one of the one or more concurrent reception beams:

(a) A reception beam wherein the beam direction matches the present location of a (single) specific RTSA, and additional beam characteristics are tailored for the specific RTSA. For instance, the beam width may be set to match the angular width of the forward scatter region for the specific RTSA;

(b) Several reception beams designed to obtain monopulse measurements using RTSA resultant signals transmitted by a (single) specific RTSA. Any monopulse method known in the art may be employed, e.g., amplitude monopulse, phase monopulse, or multi-beam monopulse;

(c) Several reception beams designed to obtain interferometric direction-finding measurements using RTSA resultant signals transmitted by a (single) specific RTSA. Any interferometric direction-finding method known in the art may be employed;

(d) A reception beam wherein the beam characteristics are determined so as to allow concurrent utilization of RTSA resultant signals transmitted by multiple RTSAs, wherein the spatial angles of the multiple RTSAs with respect to the antenna module (52) of the passive RF sensor unit (50) are typically relatively similar;

(e) Several reception beams designed to concurrently obtain monopulse measurements using RTSA resultant signals transmitted by multiple RTSAs, wherein the spatial angles of the multiple RTSAs with respect to the antenna module (52) of the passive RF sensor unit (50) are typically relatively similar. Any monopulse method known in the art may be employed, e.g., amplitude monopulse, phase monopulse, or multi-beam monopulse; and (f) Several reception beams designed to concurrently obtain interferometric direction-finding measurements using RTSA resultant signals transmitted by multiple RTSAs, wherein the spatial angles of the multiple RTSAs with respect to the antenna module (52) of the passive RF sensor unit (50) are typically relatively similar. Any interferometric direction-finding method known in the art may be employed.

Note that, for most satellites, accurate information regarding their location as a function of time as well as their RF transmission parameters is publicly available. The location and transmission parameters of most commercial aerostats are also well known.

Multi-Sensor Analysis Units and Central Analysis Units

In some embodiments, each of the multi-sensor analysis units (70) comprises the following:

(a) A multi-sensor computation module (71), which may include one or more of the following: a central processing unit (CPU), a graphic processing unit (GPU), a digital signal processor (DSP), a field-programmable gate array (FPGA), or an application specific integrated circuit (ASIC). The multi-sensor computation module (71) processes data received from two or more passive RF sensor units (50), and optionally from other multi-sensor analysis units (70), to provide one or more of the following (as described herein below), relating to UA situational surveillance:
  (i) Target location and/or velocity estimation;
  (ii) Target tracking;
  (iii) Target classification into one of several predefined categories, e.g., UA, manned aircraft, bird, and insect;
  (iv) Identification of a target's specific type, possibly including the target's make and/or model; and
  (v) Prediction and/or detection of events associated with UA safety and/or security;

(b) A multi-sensor communication module (72), which may be wired and/or wireless, and can be used for data transfer between the multi-sensor analysis unit (70) and: one or more passive RF sensor units (50), one or more other multi-sensor analysis units (70), the central analysis unit (75), and/or one or more user interface units (90).

In certain embodiments, the multi-sensor computation module (71) may also control one or more passive RF sensor units (50) to which it is connected via the multi-sensor communication module (72).

In further embodiments, the central analysis unit (75) comprises the following:

(a) A central computation module (76), which may include one or more of the following: a central processing unit (CPU), a graphic processing unit (GPU), a digital signal processor (DSP), a field-programmable gate array (FPGA), or an application specific integrated circuit (ASIC). The central computation module (76) processes data received from one or more multi-sensor analysis units (70) and/or from one or more passive RF sensor units (50), to provide UA situational surveillance for the entire target volume;

(b) A central communication module (77), which may be wired and/or wireless, and can be used for data transfer between the central analysis unit (75) and: one or more passive RF sensor units (50), one or more multi-sensor analysis units (70), and/or one or more user interface units (90).

In even further embodiments, the central computation module (76) may also control one or more multi-sensor analysis units (70) and/or one or more passive RF sensor units (50) to which it is connected via the multi-sensor communication module (77).

Target Detection

Target detection may be performed by the digital module (56) of the passive RF sensor units (50).

Due to the forward scatter geometry employed in the present invention, in the presence of a single RTSA and a single target which produces measurable contribution to the RTSA resultant signal received by a passive RF sensor unit (50), the RTSA resultant signal typically includes two main contributions:

(a) Signal resulting from reflection and/or scattering from the single target ("target resultant signal"); and (b) Signal resulting directly from the transmissions of the single RTSA, excluding reflection and/or scattering from the single target ("transmission resultant signal"), which approximately equals the RTSA resultant signal after subtracting the contribution of signal resulting from reflection and/or scattering from the single target.

The power ratio between the target resultant signal and the transmission resultant signal ("target-transmission power ratio") can be estimated using the bi-static radar equation. The target resultant signal is also shifted (delayed) in time with respect to the transmission resultant signal, wherein the time-delay ta is given by:

$$t_d = \frac{1}{c}(R_1 + R_2 - R) \tag{3}$$

where c is the speed of light, $R_1$ is the distance between the single RTSA and the single target, $R_2$ is the distance between the single target and the passive RF sensor unit (50), and R is the distance between the single RTSA and the passive RF sensor unit (50). The time-delay $t_d$ may also be affected by medium related physical phenomena, such as diffraction and multi-path. Note that there is no time-delay when the target is located along the baseline, i.e., the line connecting the single RTSA and the passive RF sensor unit (50). The target resultant signal may also be phase-shifted with respect to the transmission resultant signal, wherein the phase-shift may result from one or more of the following:

(a) The difference in length between the path travelled by the target resultant signal and the path travelled by the transmission resultant signal;

(b) Bi-static Doppler shift; and (c) The inherent phase of the single target's RCS.

Practical scenarios may involve multiple targets, multiple RTSAs, and/or multiple passive RF sensor units (50), but the target-transmission power ratio, the time-delay $t_d$, and the phase-shift of the target resultant signal with respect to the transmission resultant signal still apply (for each RF sensor unit (50), for each RTSA, and for each target separately).

In some embodiments, target detection for a given reception beam comprises one or more of the following methods:

(a) Defining one or more attributes of the received RTSA resultant signal ("RTSA resultant signal attributes"), computing the values of the one or more RTSA resultant signal attributes for one or more time-swaths during the reception beam, and detecting deviations from the expected values of the one or more RTSA resultant signal attributes that meet certain predefined criteria. For instance, the predefined criteria may include that criterion that the deviation magnitude exceeds a certain constant. The one or more RTSA resultant signal attributes may include, e.g.: mean magnitude, magnitude standard deviation, mean phase, and phase standard deviation. For example, for an RTSA that transmits a CW signal having a constant power, the magnitude standard deviation may be used as one of the one or more RTSA resultant signal attributes;

(b) Estimating the transmission resultant signal, and detecting differences between the received RTSA resultant signal and the estimated transmission resultant signal that meet certain predefined criteria;

(c) Applying auto-correlation to the received RTSA resultant signal, and detecting deviations between the auto-correlation output and the auto-correlation output expected in the absence of targets, which meet certain predefined criteria. The statistical attributes of the auto-correlation output expected in the absence of targets may be derived from statistical analysis of the auto-correlation output obtained in the past (one may use all past reception beams or a subset thereof, e.g., only reception beams with a similar beam direction and/or a similar reception central frequency and/or a similar reception bandwidth);

(d) Estimating the transmission resultant signal, applying cross-correlation between the received RTSA resultant signal and the estimated transmission resultant signal, and detecting peaks in the cross-correlation output other than the peak corresponding to a zero time-delay (which results from the contribution of the transmission resultant signal to the RTSA resultant signal) that meet certain predefined criteria; and (e) Estimating the transmission resultant signal, computing the difference between the received RTSA resultant signal and the estimated transmission resultant signal to obtain a "resultant signal difference", computing the cross-correlation between the resultant signal difference and the estimated transmission resultant signal, and detecting peaks in the cross-correlation output that meet certain predefined criteria.

Methods (a) and (b) are jointly referred to as "deviation-based methods," and methods (c), (d), and (e) are jointly referred to as "correlation-based methods." Note that the correlation-based methods are typically effective when the target is not very close to the baseline, whereas the deviation-based methods may be effective regardless of the target's proximity to the baseline.

In further embodiments, the estimating the transmission resultant signal comprises the following:

(a) Estimating the signal transmitted by the applicable RTSA (or RTSAs). This may be done in various ways. For example, if the applicable RTSA transmits a communication signal which employs a known communication protocol, one may use any method known in the art to decode the received RTSA resultant signal, and compute the estimated signal transmitted by the applicable RTSA based on the output of the decoding;

(b) Estimating the effect of the signal interaction with the medium and/or the terrain ("signal interaction effect"). This effect may include, for instance, one or more of the following: attenuation, time-delay, phase-shift, polarization-shift, and linear filtering (which may represent artifacts such as smearing due to dispersion, and temporal sidelobes resulting from multi-path);

(c) Applying the estimated signal interaction effect to the estimated signal transmitted by the applicable RTSA, to obtain the estimated transmission resultant signal.

In even further embodiments, the target detection process may be used to estimate the target's RCS at forward scatter, as follows:

(a) The target-transmission power ratio may be measured based on outputs computed by the target detection process. This may be done using one or more of the following:

(i) When employing deviation-based methods, the target-transmission power ratio approximately equals the maximal value (or a certain high percentile) of the ratio between: (1) the squared value of the absolute difference between the received RTSA resultant signal and the estimated transmission resultant signal; and (2) the squared magnitude of the estimated transmission resultant signal;

(ii) When employing correlation-based methods using auto-correlation, the target-transmission power ratio equals the squared value of the difference between the auto-correlation output and the auto-correlation output expected in the absence of targets (at the point where the absolute difference is highest); and (iii) When employing correlation-based methods using cross-correlation, the target-transmission power ratio equals the squared cross-correlation value at the detected peak whose magnitude is highest; and (b) The target's RCS at forward scatter may be derived from the target-transmission power ratio using the bi-static radar equation.

In some embodiments, target detection further comprises a pre-processing step, including one or more of the following:

(a) Beamforming on reception (relevant, for instance, when the sampling performed by the RF module (54) is not applied to a fully beamformed signal); and (b) Digital band-pass filtering whose central frequency and bandwidth are derived from the frequency range employed by a specific RTSA (relevant, for example, when the bandwidth of the signal sampled by the RF module (54) exceeds the bandwidth used by the specific RTSA). The bandwidth employed by the digital band-pass filtering may be similar to, equal to, or lower than the bandwidth employed by the specific RTSA.

In certain embodiments, the location of at least one of the RTSAs with respect to at least one of the passive RF sensor units (50), as well as the beam pattern of the at least one of the RTSAs in the direction of the at least one of the passive RF sensor units (50), are such that most of the RF propagation is along an axis perpendicular to the earth's surface. This typically results in minimizing multi-path effects in complex environments, such as urban areas and mountainous regions.

In further embodiments, the target detection process is performed no more than once for each reception beam. In other embodiments, in at least one of the reception beams, the target detection process is performed multiple times, e.g., for each of two or more predefined time-swaths, which may or may not have some overlaps.

Target Location and/or Velocity Estimation

Gathering information required for target location and/or velocity estimation may be performed by the digital module (56) of the passive RF sensor units (50).

Target location and/or velocity estimation may be performed by one or more of: the digital module (56) of the passive RF sensor units (50), the multi-sensor computation module (71) of the multi-sensor analysis units (70), and/or the central computation module (76) of the central analysis unit (75).

In embodiments, gathering information required for target location estimation comprises one or more of the following:

(a) Bi-static range measurement. A target's bi-static range $R_{bs}$ is defined as:

$$R_{bs} = R_1 + R_2 - R \quad (4)$$

where $R_1$ is the distance between the applicable RTSA and the target, $R_2$ is the distance between the target and the passive RF sensor unit (50), and R is the distance between the applicable RTSA and the passive RF sensor unit (50). Note that all geometric locations over an ellipsoid whose centers match the location of the applicable RTSA and the passive RF sensor unit (50) have the same bi-static distance. Also note that the measured bi-static range $R_{bs}$ may be affected by medium related physical phenomena, such as diffraction and multi-path. The bi-static range measurement may be performed in various ways. In certain embodiments, the bi-static range measurement may be based on outputs computed by the target detection process. For example, when target detection is performed employing correlation-based methods using cross-correlation, the bi-static range equals the time difference between the detected peak whose magnitude is highest and the center of the cross-correlation output (corresponding to a zero time-delay), multiplied by the speed of light;

(b) Monopulse measurement, providing an estimate of the spatial angle of the target with respect to the antenna module (52) of the passive RF sensor unit (50). Any monopulse method known in the art may be employed, e.g., amplitude monopulse, phase monopulse, or multi-beam monopulse; and (c) Interferometric direction-finding measurements, providing an estimate of the spatial angle of the target with respect to the antenna module (52) of the passive RF sensor unit (50). Any interferometric direction-finding method known in the art may be employed.

In some embodiments, gathering information required for target velocity estimation comprises one or more of the following:

(a) Bi-static Doppler shift measurement. A target's bi-static Doppler shift $$f_{bs}^{D}$$

equals:

$$f_{bs}^{D} = -\frac{1}{\lambda}\frac{d}{dt}(R_1 + R_2) \quad (5)$$

where $\lambda$ is the transmitted wavelength, d/dt is the time derivative operator, $R_1$ is the distance between the applicable RTSA and the target, and $R_2$ is the distance between the target and the passive RF sensor unit (50). Any method known in the art for Doppler shift measurement may be employed. For instance, one may estimate the transmission resultant signal (e.g., as described herein above), apply matched filtering between the received RTSA resultant signal and the estimated transmission resultant signal, apply discrete Fourier transform (DFT) to the matched filtering output, and determine the location in the peak whose magnitude is highest within the DFT output; and (b) Measurement of the time difference between target detections in two reception beams, wherein the two reception beams have a similar or equal beam direction and a similar or equal start-time ("time-difference measurement"). In some scenarios, such target detections may not result from the same physical target, so one may define certain criteria to the use of the time-difference measurement, e.g., that the ratio between the target RCS measured for the detections in the two reception beams would be close enough to 1.0. Note that for short enough time durations, UAs typically maintain straight and level flight, so if the detections in the two reception beams correspond to the same physical target, the target RCS measured for the two reception beams should be similar.

In further embodiments, target location estimation comprises one or more of the following:

(a) Combining the bi-static range measurement with the monopulse measurement and/or the interferometric direction-finding measurement obtained using one or more concurrent or essentially concurrent reception beams having similar beam directions. The output of the bi-static range measurement yields an ellipsoid on which the target is located, and the monopulse measurement and/or the interferometric direction-finding measurement provides the target direction with respect to the antenna module (52) of the passive RF sensor unit (50). The target is located at the intersection point between the two; and (b) Multilateration using bi-static range measurements and/or monopulse measurements and/or interferometric direction-finding measurements obtained using two or more concurrent or essentially concurrent reception beams. The two or more reception beams may be associated with one or more passive RF sensor units (50). In some scenarios, the measurements obtained for the two or more reception beams may not relate to the same physical target, so one may define certain criteria to the use of such measurements, e.g., that the ratio between the target RCS measured for each two reception beams would be close enough to 1.0.

In even further embodiments, target velocity estimation comprises one or more of the following:

(a) Combining two or more bi-static Doppler shift measurements obtained for two or more concurrent or essentially concurrent reception beams, wherein the bi-static Doppler shift measurement obtained for each of the reception beams provides information regarding a certain component of the target's velocity. The two or more reception beams may be associated with one or more passive RF sensor units (50);

(b) Combining two or more time-difference measurements obtained concurrently or essentially concurrently; and (c) Combining one or more bi-static Doppler shift measurements and one or more time-difference measurements obtained concurrently or essentially concurrently.

Target Tracking

Target tracking may be performed by one or more of: the digital module (56) of the passive RF sensor units (50), the multi-sensor computation module (71) of the multi-sensor analysis units (70), and/or the central computation module (76) of the central analysis unit (75).

In embodiments, target tracking comprises:

(a) Target association, which comprises associating target detection outputs and/or target tracking outputs which are determined to correspond to the same physical target, and are obtained at different times and/or by different reception beams and/or by different passive RF sensor units (50); and (b) For each target, applying any tracking method known in the art to the outputs of target association, e.g., a Kalman filter or an alpha-beta filter.

In some embodiments, target association is performed by:

(a) Measuring the statistical distance between one or more pairs of target detection outputs, one or more pairs of target tracking outputs, and/or one or more pairs comprising a target detection output and a target tracking output (collectively "detection-tracking pairs"); and (b) Associating detection-tracking pairs for which the measured statistical distance is lower than a predefined threshold.

In certain embodiments, the statistical distance between a pair of target detection outputs may be a function of one or more of the following:

(a) The time difference between the target detection outputs;

(b) The spatial distance between the corresponding target location estimations;

(c) The difference between the corresponding bi-static Doppler shift measurements; and (d) The difference between the corresponding target RCS estimations.

In further embodiments, the statistical distance between a pair of target tracking outputs may be a function of one or more of the following:

(a) One or more statistical parameters (e.g., mean, median, or 90th percentile) of the spatial distance between the target trajectories derived from the two target tracking outputs;

(b) One or more statistical parameters (e.g., mean, median, or 90th percentile) of the spatial distance between the two target tracking outputs as a function of time;

(c) One or more statistical parameters (e.g., mean, median, or 90th percentile) of the absolute difference between the target velocity vectors estimated for the two target tracking outputs as a function of time;

(d) One or more statistical parameters (e.g., mean, median, or 90th percentile) of the ratio between the target RCS estimations for the two target tracking outputs as a function of time;

(e) Matching of the target classification into one of several predefined categories associated with the two target tracking outputs; and (f) Matching of the identification of the target's specific type associated with the two target tracking outputs.

In even further embodiments, the statistical distance between a pair comprising a target detection output and a target tracking output may be a function of one or more of the following:

(a) The time difference between the target detection output and the closest time for which information has been provided to the target tracking process;

(b) The spatial distance between the target location estimation for the target detection output and the target location estimation for the target tracking output, interpolated or extrapolated to the time of the target detection;

(c) The difference between the bi-static Doppler shift measurement for the target detection output and the bi-static Doppler shift derived from the target tracking output for the time of the target detection; and (d) The ratio between the target RCS estimation for the target detection output and the target RCS estimation for the target tracking output, interpolated or extrapolated to the time of the target detection.

Target Classification and/or Identification

Gathering information required for target classification into one of several predefined categories and/or gathering information required for identification of a target's specific type may be performed by the digital module (56) of the passive RF sensor units (50).

Target classification into one of several predefined categories ("target classification") and/or identification of a target's specific type ("target identification") may be performed by one or more of: the digital module (56) of the passive RF sensor units (50), the multi-sensor computation module (71) of the multi-sensor analysis units (70), and/or the central computation module (76) of the central analysis unit (75).

In some embodiments, target classification and/or target identification may employ any classification method known in the art. For example, one or more of the following methods may be used for each target:

(a) One or more target characteristics may be computed. This may be done based on the applicable target tracking outputs and/or one or more of the associated: target detection outputs, target location estimations, target velocity estimations, and target RCS estimations. The target characteristics may include, for example, parameters relating to the target trajectory, target dynamics over time, target RCS distribution, and/or target RCS as a function of time. The computed target characteristics may then be compared to reference models associated with certain target categories (for target classification) and/or certain target types (for target identification) using any technique known in the art, for instance:

(i) Applying one or more thresholds to each target characteristic, to obtain a set of binary values. Predefined logic criteria may then be applied to the set of binary values, e.g., the sum of the binary values should exceed a certain number;

(ii) Applying one or more thresholds to each target characteristic, to obtain a set of binary values, and then using the Dempster-Shafer theory;

(iii) Defining a multi-dimensional target characteristic space, whose dimensionality matches the number of target characteristics, and mapping target categories and/or target types to sub-spaces; and/or (iv) Employing neural-network based algorithms, e.g., deep learning algorithms, or any other machine learning method known in the art; and (b) One or more parameters as a function of time, derived from one or more of: the applicable target tracking outputs, the associated target detection outputs, the associated target location estimations, the associated target velocity estimations, and the associated target RCS estimations, may be directly processed using any method known in the art. For instance, neural-network based algorithms, such as deep learning algorithms, can be employed.

Management of Reception Beams

The management of the reception beams produced by the passive RF sensor unit (50) may be performed by the digital module (56) of the passive RF sensor units (50).

In some embodiments, the management of the reception beams comprises the determination of the number of the reception beams used at any given time and/or the determination of one or more parameters for at least one of the reception beams.

In further embodiments, the management of the reception beams may aim to maximize the probability of target detection within the target volume, and/or to maximize target tracking performance within the target volume. This may be done using information produced by the passive RF sensor unit (50), information produced by one or more multi-sensor analysis units (70), and/or information produced by the central analysis unit (75).

Integration with Other Systems

In embodiments, at least one of the passive RF sensor units (50) may comprise one or more sensors of another type (i.e., other than a passive RF sensor unit (50)). Each of the one or more sensors of another type may be, e.g., a radar, an RF sensor monitoring the spectrum, an acoustic sensor, a video camera, an electro-optical sensor, an infrared sensor, or an identification friend-or-foe (IFF) system.

In some embodiments, the outputs of the one or more sensors of another type may be employed by one or more of: one or more of the passive RF sensor units (50), one or more of the multi-sensor analysis units (70), and the central analysis unit (75).

In certain embodiments, one or more of the passive RF sensor units (50), one or more of the multi-sensor analysis units (70), and/or the central analysis unit (75) may provide information to and/or receive information from a UA traffic management system (or one or more components and/or services thereof), e.g., UAS traffic management (UTM) in the USA, or U-Space in the EU.

In further embodiments, one or more of the passive RF sensor units (50), one or more of the multi-sensor analysis units (70), and/or the central analysis unit (75) may provide real-time UA situational surveillance information to one or more UAs. The real-time UA situational surveillance information may be used, for example, for purposes of collision avoidance, in addition to or instead of an onboard detect-and-avoid (DAA) system.

Event Prediction and Detection

Prediction and/or detection of events associated with UA safety and/or security ("event prediction/detection") may be performed by one or more of: the digital module (56) of the passive RF sensor units (50), the multi-sensor computation module (71) of the multi-sensor analysis units (70), and/or the central computation module (76) of the central analysis unit (75).

In some embodiments, event prediction/detection is performed by analyzing one or more of the following:

(a) Target tracking outputs;
(b) Target classification outputs;
(c) Target identification outputs;
(d) Information received from sensors of another type (i.e., other than a passive RF sensor unit (50)), e.g., a radar, an RF sensor monitoring the spectrum, an acoustic sensor, a video camera, an electro-optical sensor, an infrared sensor, or an identification friend-or-foe (IFF) system; and
(e) Information received from a UA traffic management system;

In further embodiments, event prediction/detection addresses one or more of the following types of events:

(a) UAs that do not adhere to safety requirements and/or applicable regulations, for instance, regarding minimal separation between aircrafts;
(b) UAs that do not transmit remote identification ("remote ID") information, that is, UAs detected and tracked by a system of the present invention but do not provide information to an applicable UA traffic management system. Remote ID typically includes location and identification information. In certain jurisdictions, e.g., the USA and the EU, most UAs are required by regulation to broadcast remote ID information;
(c) UAs that transmit remote ID information but whose remote ID information does not match the outputs of target tracking provided by a system of the present invention; and
(d) UAs that enter unauthorized airspace, optionally taking into account target classification and/or target identification outputs.

In the above description, an embodiment is an example or implementation of the invention. The various appearances of "one embodiment," "an embodiment," "some embodiments," "other embodiments," "further embodiments," or "certain embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment. Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belongs, unless otherwise defined.

The invention claimed is:

1. A system for passive sensing of unmanned aircrafts (UAs) within a target volume using radio frequency (RF) signals transmitted by satellites and/or aerostats, the system comprising:

one or more passive RF sensor units, wherein each of the one or more passive RF sensor units is configured to:

produce one or more concurrent reception beams, wherein at least one of the one or more concurrent reception beams has a beam direction that matches a present location of an RF-transmitting satellite or aerostat (RTSA) and a beam width that matches an angular width of a forward scatter region, and wherein the RTSA is one of a satellite and an aerostat, which transmits RF signals;

receive RTSA resultant signals originating from one or more RTSAs, wherein the RTSA resultant signals are signals transmitted by the one or more RTSAs after traversing a medium between the one or more RTSAs and the one or more passive RF sensor units; and process the received RTSA resultant signals to perform target detection and/or target location estimation based on the forward scatter effect, wherein target detection for a given reception beam comprises one or more of the following:

defining one or more RTSA resultant signal attributes, computing values of the one or more RTSA resultant signal attributes for one or more time-swaths during a reception beam, and detecting deviations from expected values of the one or more RTSA resultant signal attributes that meet certain predefined criteria;

estimating a transmission resultant signal, and detecting differences between the received RTSA resultant signal and the estimated transmission resultant signal that meet certain predefined criteria, wherein the transmission resultant signal is the RTSA resultant signal after subtracting contributions of signals resulting from reflection and/or scattering from targets;

applying auto-correlation to the received RTSA resultant signal, and detecting deviations between an auto-correlation output and an auto-correlation output expected in the absence of targets, that meet certain predefined criteria;

estimating a transmission resultant signal, applying cross-correlation between the received RTSA resultant signal and the estimated transmission resultant signal, and detecting peaks in a cross-correlation output other than a peak corresponding to a zero time-delay that meet certain predefined criteria; and estimating a transmission resultant signal, computing a difference between the received RTSA resultant signal and the estimated transmission resultant signal to obtain a resultant signal difference, computing a cross-correlation between the resultant signal difference and the estimated transmission resultant signal, and detecting peaks in a cross-correlation output that meet certain predefined criteria.

2. The system according to claim 1, wherein the beam direction of at least one of the one or more concurrent reception beams is adjusted over time to match an RTSA trajectory.

3. The system according to claim 1, wherein one or more of the following configurations is employed for at least one of the one or more concurrent reception beams:

a reception beam with a beam direction that matches a present location of a specific RTSA, and additional beam characteristics that are tailored for the specific RTSA;

several reception beams designed to obtain monopulse measurements using RTSA resultant signals transmitted by a specific RTSA;

several reception beams designed to obtain interferometric direction-finding measurements using RTSA resultant signals transmitted by a specific RTSA;

a reception beam with beam characteristics determined so as to allow concurrent utilization of RTSA resultant signals transmitted by multiple RTSAs;

e. several reception beams designed to concurrently obtain monopulse measurements using RTSA resultant RTSAs; and signals transmitted by multiple several reception beams designed to concurrently obtain interferometric direction-finding measurements using RTSA resultant signals transmitted by multiple RTSAS.

4. The system according to claim 1, wherein beam steering is performed mechanically and/or electronically, wherein the beam steering determines the beam direction for the one or more concurrent reception beams.

5. The system according to claim 1, wherein each of the one or more passive RF sensor units comprises one or more of the following:

an antenna module, used for receiving the RTSA resultant signals;

an RF module, applying analog-to-digital conversion to the RTSA resultant signals received by the antenna module;

a digital module, processing samples generated by the RF module;

a power supply;

a GNSS receiver;

an accurate clock; and a communication module, the communication module being a wired communication module and/or a wireless communication module.

6. The system according to claim 5, wherein the RF module and/or the digital module perform one or more of the following:

phase-shifting;

true-time-delay application;

gain control;

down-conversion;

band-pass filtering;

low-pass filtering;

matched filtering; and beamforming.

7. The system according to claim 1, wherein each of the one or more passive RF sensor units is either stationary or mobile, and wherein each of the one or more passive RF sensor units is one of:

ground-based, shipborne, and airborne.

8. The system according to claim 1, wherein each of the one or more passive RF sensor units further performs one or more of the following:

target location and/or velocity estimation;

target tracking;

target classification into one of several predefined categories;

identification of a target's specific type;

prediction and/or detection of events associated with UA safety and/or security;

gathering information required for target location and/or velocity estimation;

gathering information required for target classification into one of several predefined categories; and gathering information required for identification of a target's specific type.

9. The system according to claim 1, wherein the system further comprises one or more multi-sensor analysis units, wherein each of the one or more multi-sensor analysis units receives and processes data from at least one of the one or more passive RF sensor units, and wherein each of the one or more multi-sensor analysis units performs one or more of the following:

target location and/or velocity estimation;

target tracking;

target classification into one of several predefined categories;

identification of a target's specific type;

prediction and/or detection of events associated with UA safety and/or security; and control of at least one of the one or more passive RF sensor units to which it is connected.

10. The system according to claim 9, wherein the system further comprises a central analysis unit that receives and processes data from at least one of the one or more multi-sensor analysis units and/or data from at least one of the one or more passive RF sensor units, to provide UA situational surveillance for an entire target volume and to control the one or more multi-sensor analysis units and/or the one or more passive RF sensor units to which it is connected, wherein the UA situational surveillance comprises one or more of the following:

target detection;

target tracking;

target classification;

target identification; and prediction and/or detection of events associated with UA safety and/or security.

11. The system according to claim 1, wherein at least one of the one or more passive RF sensor units further comprises one or more sensors of another type, wherein each of the one or more sensors of another type is one of:

a radar;

an RF sensor monitoring the spectrum;

an acoustic sensor;

a video camera;

an electro-optical sensor;

an infrared sensor; and an identification friend-or-foe system.

12. The system according to claim 1, wherein the system provides information to, and/or receives information from, a UA traffic management system.

13. The system according to claim 1, wherein the system provides real-time UA situational surveillance information to one or more UAs, wherein the real-time UA situational surveillance comprises one or more of the following:

target detection;

target tracking;

target classification;

target identification; and prediction and/or detection of events associated with UA safety and/or security.

14. A method for passive sensing of unmanned aircrafts (UAs) within a target volume using radio frequency (RF) signals transmitted by satellites and/or aerostats, the method comprising:

receiving RF-transmitting satellite or aerostat (RTSA) resultant signals originating from one or more RTSAs using one or more passive RF sensor units, wherein each of the one or more passive RF sensor units employs one or more concurrent reception beams, wherein at least one of the one or more concurrent reception beams has a beam direction that matches a present location of one of the one or more RTSAs and a beam width that matches an angular width of a forward scatter region, wherein each of the one or more RTSAs is one of a satellite and an aerostat, which transmits RF signals, and wherein the RTSA resultant signals are signals transmitted by the one or more RTSAs after traversing a medium between the one or more RTSAs and the one or more passive RF sensor units; and processing the received RTSA resultant signals, wherein the processing further comprises performing target detection based on the forward scatter effect using one or more of the following:

applying auto-correlation to the received RTSA resultant signal, and detecting deviations between an auto-correlation output and an auto-correlation output expected in the absence of targets;

defining one or more RTSA resultant signal attributes, computing values of the one or more RTSA resultant signal attributes for one or more time-swaths during a reception beam, and detecting deviations from expected values of the one or more RTSA resultant signal attributes;

estimating a transmission resultant signal, and detecting differences between the received RTSA resultant signal and the estimated transmission resultant signal, wherein the transmission resultant signal is the RISA resultant signal after subtracting contributions of signals resulting from reflection and/or scattering from targets;

estimating a transmission resultant signal, applying cross-correlation between the received RTSA resultant signal and the estimated transmission resultant signal, and detecting peaks in a cross-correlation output other than a peak corresponding to a zero time-delay; and estimating a transmission resultant signal, computing a difference between the received RTSA resultant signal and the estimated transmission resultant signal to obtain a resultant signal difference, computing a cross-correlation between the resultant signal difference and the estimated transmission resultant signal, and detecting peaks in a cross-correlation output.

15. The method according to claim 14, wherein the estimating the transmission resultant signal comprises:

estimating a signal transmitted by an applicable RTSA;

estimating a signal interaction effect, the signal interaction effect being an effect of signal interaction with the medium and/or the terrain; and applying the estimated signal interaction effect to the estimated signal transmitted by the applicable RTSA, to obtain the estimated transmission resultant signal.

16. The method according to claim 14, wherein the auto-correlation output expected in the absence of targets is derived from statistical analysis of an auto-correlation output obtained in the past.

17. The method according to claim 14, wherein the performing target detection further comprises a pre-processing step, wherein the pre-processing step comprises one or more of the following:

beamforming on reception; and digital band-pass filtering whose central frequency and bandwidth are derived from a frequency range employed by a specific RTSA.

18. The method according to claim 14, wherein the processing the received RTSA resultant signals further comprises estimating a target's radar cross-section (RCS) at forward scatter by:

measuring a target-transmission power ratio based on outputs computed as part of the performing target detection, wherein the target-transmission power ratio is a power ratio between a target resultant signal and the transmission resultant signal, wherein the target resultant signal is a contribution of signal resulting from reflection and/or scattering from targets to the RTSA resultant signal; and deriving the target's RCS at forward scatter from the target-transmission power ratio using the bi-static radar equation.

19. The method according to claim 14, wherein the processing the received RTSA resultant signals further comprises one or more of:

gathering information required for target location estimation; and gathering information required for target velocity estimation;

wherein the gathering information required for target location estimation comprises one or more of the following:

bi-static range measurement based on outputs computed as part of the performing target detection;

monopulse measurement, providing an estimate of a spatial angle of a target with respect to the one or more passive RF sensor units; and interferometric direction-finding measurements, providing an estimate of a spatial angle of a target with respect to the one or more passive RF sensor units; and wherein the gathering information required for target velocity estimation comprises one or more of the following:

bi-static Doppler shift measurement; and time-difference measurement, comprising measurement of a time difference between target detections in two reception beams, wherein the two reception beams have a similar or equal beam direction and a similar or equal start-time.

20. The method according to claim 19, wherein the processing the received RTSA resultant signals further comprises the target location estimation using one or more of the following:

combining the bi-static range measurement with the monopulse measurement and/or the interferometric direction-finding measurement obtained using one or more concurrent or essentially concurrent reception beams having similar beam directions; and multilateration using bi-static range measurements and/or monopulse measurements and/or interferometric direction-finding measurements obtained using two or more concurrent or essentially concurrent reception beams, wherein the two or more concurrent or essentially concurrent reception beams may be associated with one or more of the one or more passive RF sensor units.

21. The method according to claim 19, wherein the processing the received RTSA resultant signals further comprises the target velocity estimation using one or more of the following:

combining two or more of the bi-static Doppler shift measurements obtained for two or more concurrent or essentially concurrent reception beams, wherein the two or more concurrent or essentially concurrent reception beams may be associated with one or more of the one or more passive RF sensor units;

combining two or more of the time-difference measurements obtained concurrently or essentially concurrently; and combining one or more of the bi-static Doppler shift measurements and one or more of the time-difference measurements obtained concurrently or essentially concurrently.

22. The method according to claim 14, wherein the processing the received RTSA resultant signals further comprises target tracking, wherein the target tracking comprises:

target association comprising associating target detection outputs and/or target tracking outputs which are determined to correspond to the same physical target, and are obtained at different times and/or by different reception beams and/or by different passive RF sensor units; and for each target, applying a tracking method to outputs of the target association.

23. The method according to claim 14, wherein the processing the received RTSA resultant signals further comprises target classification into one of several predefined categories and/or identification of a target's specific type.

24. The method according to claim 14, further comprising management of reception beams produced by the one or more passive RF sensor units, wherein the management of reception beams comprises at least one of:

determination of a number of reception beams used at any given time; and determination of one or more parameters for at least one of the reception beams.

25. The method according to claim 14, wherein the processing the received RTSA resultant signals further comprises prediction and/or detection of events associated with UA safety and/or security, and wherein the prediction and/or detection of events associated with UA safety and/or security addresses one or more of the following types of events:

UAs that do not adhere to safety requirements and/or applicable regulations;

UAs that do not transmit remote identification information;

UAs that transmit remote identification information but whose remote identification information does not match outputs of passive sensing of the UAs; and UAs that enter unauthorized airspace.

26. A method for passive sensing of unmanned aircrafts (UAs) within a target volume using radio frequency (RF) signals transmitted by satellites and/or aerostats, the method comprising:

receiving RF-transmitting satellite or aerostat (RTSA) resultant signals originating from one or more RTSAs using one or more passive RF sensor units, wherein each of the one or more passive RF sensor units employs one or more concurrent reception beams, wherein each of the one or more RTSAs is one of a satellite and an aerostat, which transmits RF signals, and wherein the RTSA resultant signals are signals transmitted by the one or more RTSAs after traversing a medium between the one or more RTSAs and the one or more passive RF sensor units; and processing the received RTSA resultant signals, wherein the processing further comprises performing target detection based on the forward scatter effect using one or more of the following:

applying auto-correlation to the received RTSA resultant signal, and detecting deviations between an auto-correlation output and an auto-correlation output expected in the absence of targets, that meet certain predefined criteria;

defining one or more RTSA resultant signal attributes, computing values of the one or more RTSA resultant signal attributes for one or more time-swaths during a reception beam, and detecting deviations from expected values of the one or more RTSA resultant signal attributes that meet certain predefined criteria;

estimating a transmission resultant signal, and detecting differences between the received RTSA resultant signal and the estimated transmission resultant signal that meet certain predefined criteria, wherein the transmission resultant signal is the RTSA resultant signal after subtracting contributions of signals resulting from reflection and/or scattering from targets;

estimating a transmission resultant signal, applying cross-correlation between the received RTSA resultant signal and the estimated transmission resultant signal, and detecting peaks in a cross-correlation output other than a peak corresponding to a zero time-delay that meet certain predefined criteria; and estimating a transmission resultant signal, computing a difference between the received RTSA resultant signal and the estimated transmission resultant signal to obtain a resultant signal difference, computing a cross-correlation between the resultant signal difference and the estimated transmission resultant signal, and detecting peaks in a cross-correlation output that meet certain predefined criteria.

* * * * *